United States Patent [19]
Porcelli

[11] 4,377,370
[45] Mar. 22, 1983

[54] SAFETY DEVICE FOR A ROTATING ELEMENT OF A TURBINE ENGINE

[75] Inventor: Gerard Porcelli, Yerres, France

[73] Assignee: Societe Nationale d'etude et de Construction de Moteurs d'Aviation, "S.N.E.C.M.A.", Paris, France

[21] Appl. No.: 197,601

[22] Filed: Oct. 16, 1980

[30] Foreign Application Priority Data

Oct. 19, 1979 [FR] France ............................... 79 25972

[51] Int. Cl.³ ...................... F01B 25/16; F01D 21/00
[52] U.S. Cl. ......................................... 415/9; 415/174;
415/219 R; 428/911
[58] Field of Search .................. 415/9, 196, 197, 174,
415/219 R; 428/DIG. 911, 138, 73, 116, 318.4;
60/262, 39.29, 39.23

[56] References Cited

U.S. PATENT DOCUMENTS

3,602,602  8/1971  Motta ...................................... 415/9
4,125,053 11/1978  Lasker .................................. 428/911
4,149,824  4/1979  Adamson ....................... 415/197 X

FOREIGN PATENT DOCUMENTS

1435869 1/1965 France .
2018042 5/1970 France .
2216174 8/1974 France .
2375443 7/1978 France .

*Primary Examiner*—Philip R. Coe
*Assistant Examiner*—Timothy F. Simone
*Attorney, Agent, or Firm*—Bacon & Thomas

[57] ABSTRACT

A ring is secured to the casing of the compressor or of the turbine of a turbine engine, and has an inner envelope, a first ring of segments of a honeycomb material, a winding of wire sections encased in a polymerizable resin, a second ring of honeycomb segments and an external envelope of a thin material.

9 Claims, 5 Drawing Figures

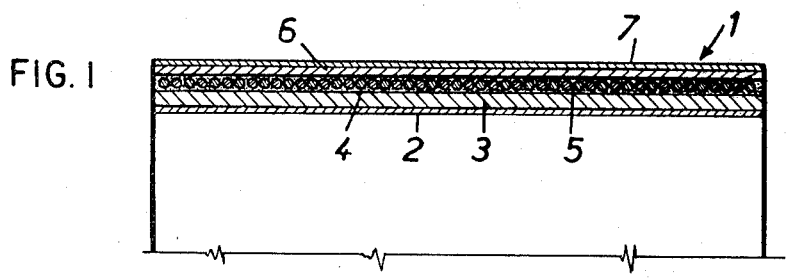
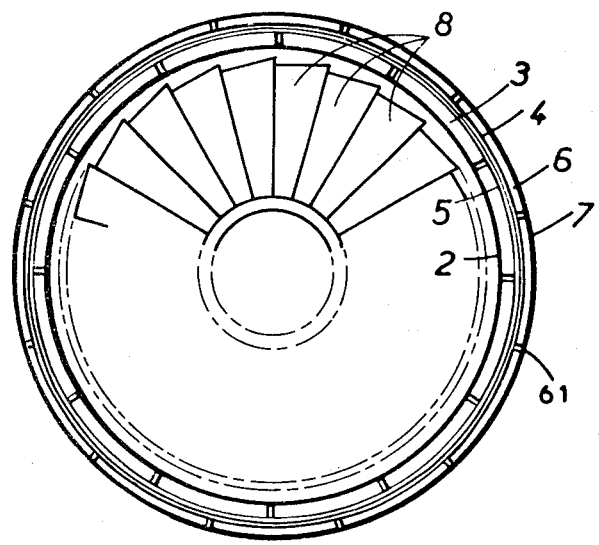
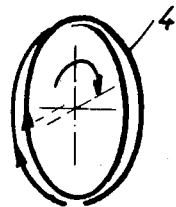
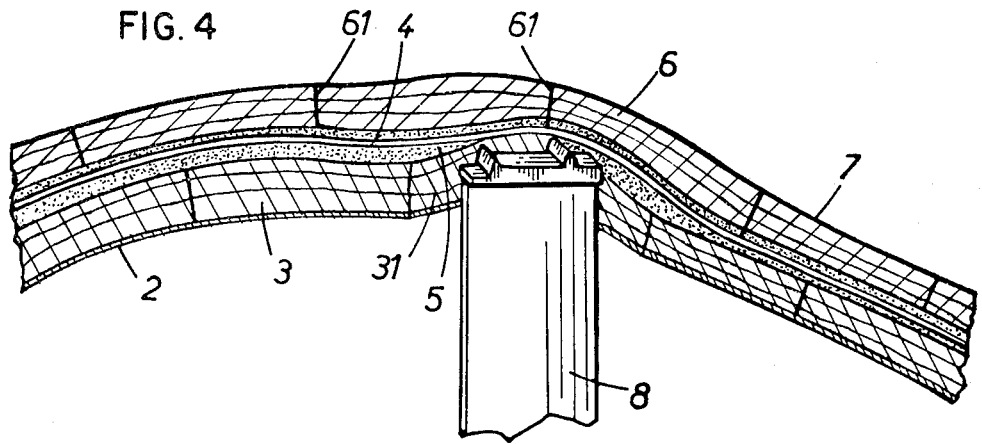

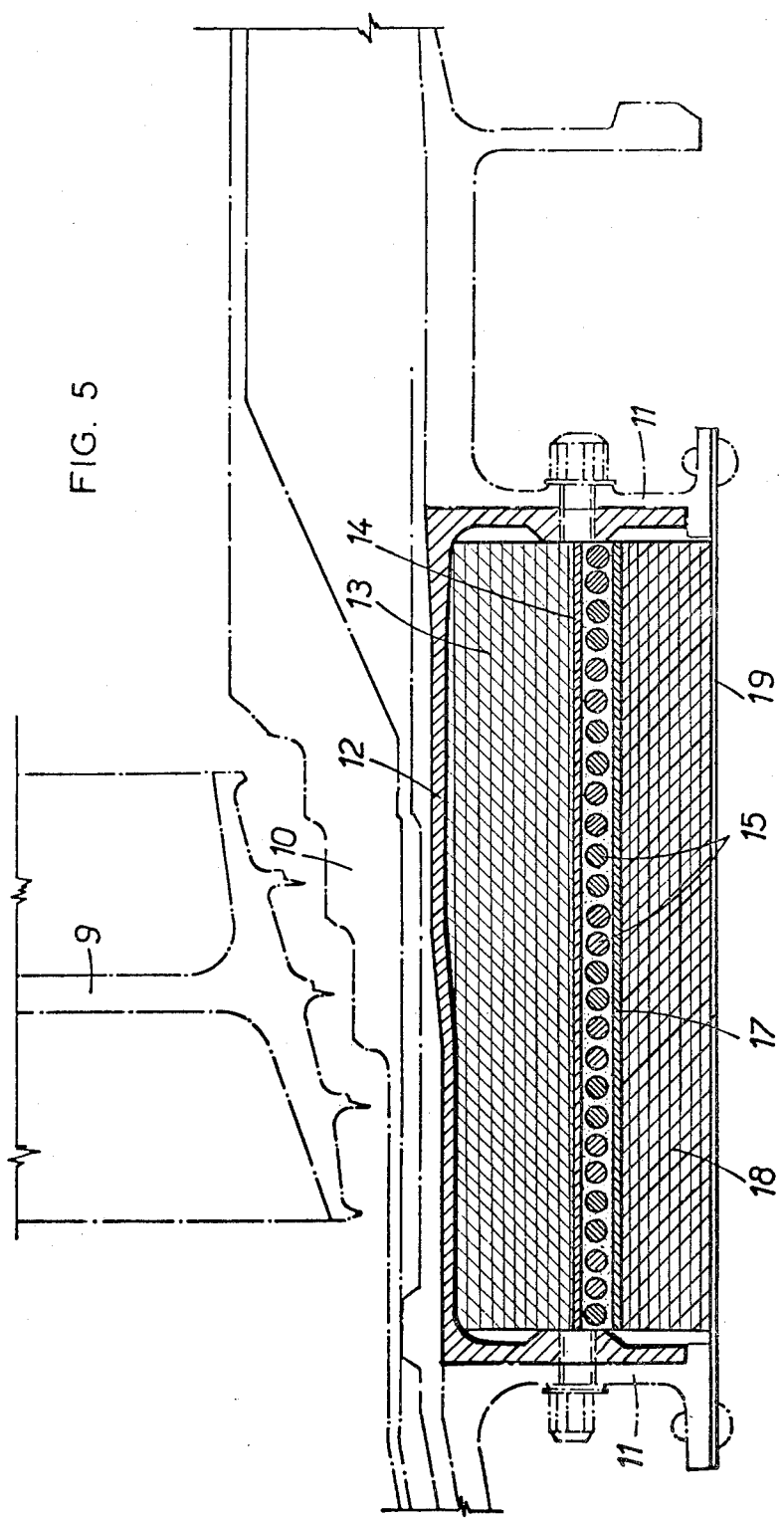

SAFETY DEVICE FOR A ROTATING ELEMENT OF A TURBINE ENGINE

BACKGROUND OF THE INVENTION

The blades and disks of the rotor of rotating machines, in the event of rupture, may cause very serious or even catastrophic secondary effects, in particular when the engine involved is propelling an aircraft.

In order to limit the consequences of such incidents, the housings of compressors and turbines have been surrounded by thick armor plating made of steel. The principal disadvantage of this solution is the added weight which penalizes the performance of the engine, and if the fragments are retained inside the housing and do not damage the other elements of the engine, this retention itself is often the cause of chain rupturing of the blades, which strike the fragments blocked within the housing. This results in an explosion of the rotor or the tearing of the engine from its support.

Designers have been searching for solutions of this problem. Thus, French Pat. No. 2,018,042 describes retaining means consisting of the housing and metal wound around its external surface. The direction of the winding of the bands is opposed to the normal direction of rotation and has the effect that when the detached fragment of the rotor strikes the bands and drags them along, the windings are tightened, which creates heavy friction to absorb the kinetic energy. The windings are limited by the elasticity of the material constituting the bands because of the fastening of their ends to the housing and the stationary mounting structure of the engine. The kinetic energy of the fragment contacting the bands has been partially absorbed by the work required to perforate or to deform the housing.

French Pat. No. 2,375,443 describes a casing ring comprising a layer of a lightweight material, specifically such as a honeycomb fastened to the retaining ring and having high mechanical strength. This ring is itself supported by wings capable of being crushed during the deformation of the retaining ring. The casing ring is maintained in a support by means of pins or by friction so that it may rotate under the impact of the fragment detached from the rotor and absorb the kinetic energy even when the retaining ring is deformed.

Finally, French Pat. No. 1,435,869 proposes a retaining ring made of an elastic and flexible material mounted in a manner so that it is free to move radially toward the outside in contact with the envelope by means of the deformation or rupture of the supporting tenons.

A retaining casing must combine three conditions which are only partially satisfied by the preceding designs, i.e. the rapid removal of the fragments from the enclosure of the rotor, the absorption of energy, so that if the fragments should break through the casing, their residual energy would be insufficient to cause damage, and finally it should be light enough so that it will not absorb an excessive fraction of the pay-load of the aircraft.

SUMMARY OF THE INVENTION

The present invention concerns a safety device in the event of the rupture of rotating elements of a turbine engine, comprising a ring surrounding a stage of blades upon which an element with an elongated shape is wound, said ring being capable of being traversed by the part of a blade or a blade itself, that has become detached and which impacts the elongated element, whereby the windings of said elongated element are displaced to absorb the kinetic energy.

It is the object of the invention to combine the above three conditions and it is characterized in that the device comprises from the inside to the outside: an inner envelope, a first ring of segments made of a deformable material, a winding of elongated elements encased in a polymerizable resin, a second ring of segments made of a deformable material and a thin external envelope.

BRIEF DESCRIPTION OF THE DRAWINGS

FIG. 1 shows a schematic view of a longitudinal section through the device of the invention;

FIG. 2 is a transverse sectional view of the device;

FIG. 3 represents the winding of a section of wire;

FIG. 4 is a diagram explaining the functioning of the device; and

FIG. 5 is an embodiment of a device according to the invention.

DESCRIPTION OF THE PREFERRED EMBODIMENTS

FIG. 1 represents a safety device for the event of rupture of a turbine engine and in particular of a jet engine. The device 1, placed inside the casing of the compressor or the turbine concerned, forms a ring surrounding a stage of blades (not shown). The ring consists as viewed from the inside out:

an internal envelope 2 made of a strong and elastic material such as steel, titanium, a fiber reinforced, synthetic resin or the like. This envelope, in keeping with the external dimensions of the casing to be protected, may consist of a single or a plurality of elements;

a first ring 3 of segments (FIG. 2), consisting of a material capable of permanent deformation such as a metal honeycomb or a composite honeycomb material with filled or unfilled cavities, a composite material that may be layered or not, a metal foam or felt of low density, that may be homogeneous or not. According to one form of embodiment, the segments are maintained in place by means of a layer of polymerizable material;

a winding 4 of elongated elements such as a wire or cable of a metallic or synthetic material wound onto the layer of the polymerizable material and the sectors. Each element forms at least two complete loops around the segments, with the ends of the element being free. The elements have a length that is equal to at least twice the circumference of the envelope around which they are wound or to an even multiple of the said circumference so as to make at least two complete turns around the envelope. The direction of the winding of the elements is that of the normal rotation of the rotor (FIG. 3). The windings are encased in a polymerizable material 5 such as a polyurethane foamed resin or the like;

a second ring 6 of segments (FIG. 2) made of a deformable material that may be identical or not with the material of the first ring. The joints 61 of the segments of the second ring are placed approximately in the center of the segments of the first ring;

a thin external envelope 7 consisting of a single or a plurality of elements.

The mode of functioning of the device according to the invention will be described with respect to FIG. 4.

The blade or blade fragment 8, escaping from the blading of the rotor, pierces the internal envelope 2 under the action of the centrifugal force and the kinetic energy that it possesses. It penetrates the segment 31 located perpendicularly to the point of support. The material of the segment is crushed and the entirety of the segment is deformed under the centrifugal thrust of the fragment which tends to move away from the center of the engine. The elements 4 resist this motion. The kinetic energy of the fragment is absorbed by the friction of the wires or cables 4 in the layer 5 of the synthetic resin or foam, and in the form of an internal tensile stress.

The segments of the second ring 6 are stressed in turn, they are deformed radially and in turn they deform the external envelope 7.

In summary, the kinetic energy of the blade or the fragment of a blade is absorbed: by the perforation of the internal envelope 2, by the deformation of the segment 3, by the friction of the cables 4 on the matrix 5 and their elongation, by the deformation of the segment 6, by the deformation of the external envelope 7 and by the compression of the segments that remained intact when the cables are extended.

The example of embodiment shown in FIG. 5 corresponds to an application of the device to an engine with a blower having a casing diameter of approximately 1.8 meter, for a blade fragment of 0.8 kg, having a projection velocity that corresponds to a linear velocity of the tip of the blade of the order of 200 m/s.

The device is secured in the zone traversed by the blading of the compressor and more particularly facing a ring of blades, one of which, 9, is shown. In a conventional manner, a layer 10 of a material capable of entering into contact with the tips of the blades without causing their abrasion and forming tight seals. The device is in the form of an assembly maintained between the supports 11 of the casing of the compressor by means of bolting. The internal envelope 12 is made of steel with a thickness of 1.5 to 2 mm. For ease of manufacture, it is constituted by two semi-circular segments, the cylindrical or conical geometry of which depends on the type of engine. The first ring 13 consists of steel honeycomb segments having a thickness of the order of 20 mm. The segments are maintained by means of an envelope 14 of steel with a thickness of 0.5 to 0.8 mm. Onto this envelope a thin layer of polyurethane foamed resin is deposited. The cables 15, made of a polyimide with a diameter of 4 mm and a length that makes it possible to make two loops around the envelope, are wound in the direction of the rotation of the engine, with their turns practically touching. The winding obtained in this manner is encased in foamed resin. An envelope 17 of steel with a thickness of 0.5 to 0.8 mm covers the preceding layer and supports a second ring 18 formed by segments of a light alloy honeycomb with a thickness of 15 mm. This ring is supported by an external envelope 19 of sheet steel with a thickness of 0.5 to 0.8 mm, secured by two straps of the casing.

If the layer 10 of the sealing material is omitted, the structure described hereinabove may serve as an acoustical panel; the internal envelope 12 is then perforated and the segments 13 constitute Helmoholtz resonators.

Because of the use of synthetic foam to encase the cables, the above-described structure cannot be used for thermal protection. Such an application would involve a change of materials which is within the capability of those skilled in the art.

I claim:

1. Safety device for a rotating element of a turbine engine located in the casing of an engine and having rotating blades, comprising a ring surrounding a stage of blades, upon which is wound an elongated element, said ring being capable of being traversed by a fragment of a ruptured blade or a blade that has been detached and which strikes the elongated element, and wherein the windings of said elongated element move to absorb the kinetic energy, the improvement comprising: starting from the innermost layer an internal envelope, a first ring of segments made of a deformable material, a winding of an elongated element encased in a polymerizable material, a second ring of segments made of a deformable material and a thin external envelope.

2. Device according to claim 1, wherein the winding of the elongated element encased in a polymerizable resin is contained between envelopes of an elastic material.

3. Device according to claim 1 or 2, wherein the winding of the elongated element consists of wire sections having a length of at least two times the circumference of the envelope upon which they are coiled thus providing for the production of complete loops.

4. Device according to claim 3, wherein the ends of the wire sections are free.

5. Device according to claim 3, wherein the direction of winding is of the elongated element in the direction of the rotation of the blades.

6. Device according to claim 3, wherein the elongated element consists of polyimide cables encased in a foamed resin.

7. Device according to claim 1, wherein the segments are formed of a honeycomb material.

8. Device according to claim 1, wherein the internal envelope is perforated and defines with the sectors, acoustic panels.

9. Device according to claim 1 wherein said internal envelope is formed of two steel semi-circular segments, said first ring of segments being of a steel honeycomb material; a first envelope of sheet steel, a winding of sections of polyimide cables encased in foamed resin, a second sheet steel envelope, a second ring of light alloy honeycomb segments and an external envelope of sheet steel bolted to straps of the casing of the engine.

* * * * *